Sept. 19, 1961 F. GEORGE 3,001,063

SELECTIVE RADIO COMMUNICATION BETWEEN WAY STATIONS AND CONTROL OFFICE

Filed Aug. 30, 1956 3 Sheets-Sheet 1

INVENTOR.

F. GEORGE

BY Forest B. Hitchcock

HIS ATTORNEY

INVENTOR.
F. GEORGE
BY Forest B. Hitchcock
HIS ATTORNEY

INVENTOR.
F. GEORGE
BY Forest B. Hitchcock
HIS ATTORNEY

United States Patent Office 3,001,063
Patented Sept. 19, 1961

3,001,063
SELECTIVE RADIO COMMUNICATION BETWEEN WAY STATIONS AND CONTROL OFFICE

Franklin George, Tarrytown, N.Y., assignor to General Railway Signal Company, Rochester, N.Y.
Filed Aug. 30, 1956, Ser. No. 607,070
11 Claims. (Cl. 246—7)

Figure 1:
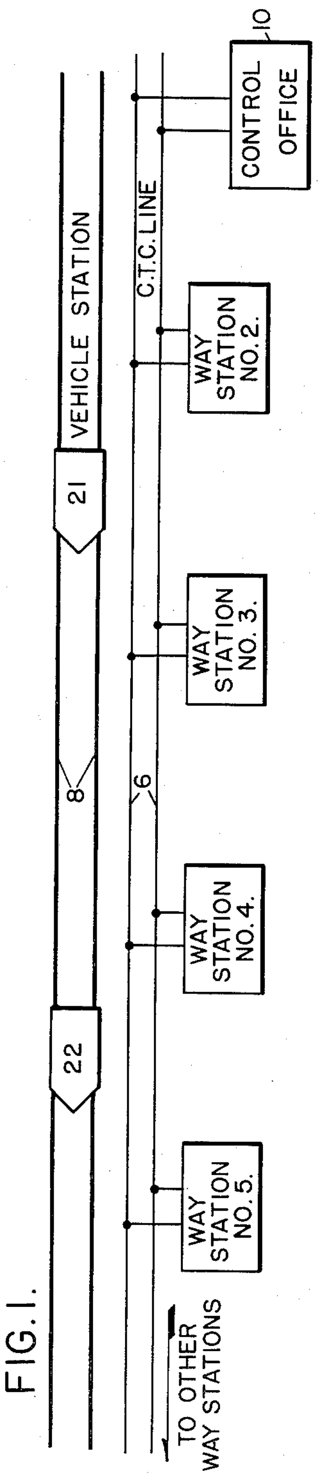

This invention relates to a communication system for railroads and more particularly to a radio communication system for communication between a control office station and a vehicle station moving along a trackway along which a plurality of spaced wayside stations are located.

In a system involving communication to and from moving vehicle stations throughout an area under the direction of a central office, it is expedient to employ train-carried radio transmitting and receiving equipment having an effective range much less than such area in order to minimize interference with long range radio transmission on assigned frequency channels. Further, it is expedient to employ a plurality of wayside stations each with a similar effective radio range and coupled to the control office by means of a line circuit, over which messages may be transmitted to the control office from the vehicle station by way of a particular wayside station. Communication over a system operated in such manner may then be carried on regardless of the limited range of the radio equipment. In such an organization, it will be apparent that the several way stations will include radio transmitting and receiving equipment also of limited range comparable to the range of the various vehicle stations.

One problem involved in a communication organization of this type is, that when a given vehicle station is communicating with the control office, means must be provided to prevent interruption or interference with such existing communication, by another vehicle station which is desirous of communication with the control office and attempts such communication. The usual system arrangement of this character, however, has no provision for preventing such interruption but rather depends upon the integrity of the operator at the various vehicle stations to determine whether a conversation is in progress before he initiates his own call, all in a manner similar to a telephone party line. Other systems have guarded against such occurrence by accomplishing a complete "lockout" of all other vehicle stations during communication between the control office and a particular vehicle station.

It is an object of the present invention therefore, to provide a system for communicating exclusively with a particular vehicle station but which will at the same time provide a means for other vehicle stations to make known their desire to communicate with the control office. Such an indication is registered at the control office, but actual communication cannot be carried on until the indication is acknowledged by the control office operator, thereby preventing interruption or interference with an existing communication yet informing the control office that a call is waiting.

Another problem encountered in communication organizations for railroads is the availability of existing communication facilities which may parallel the route. The usual system either makes no provision for utilizing the communicating or signaling facilities which may parallel the vehicle route, requiring the installation of additional line wires, or such systems provide for the use of paralleling facilities, such as telephone, telegraph and power lines for the purpose of superimposing the communication system thereon. In either event, both methods require the presence of at least two line wires over which a voice communication system may operate, in addition to any other control or indication line circuits.

Therefore, a further object of the present invention is, to provide a system for communication between a control office and various vehicle stations by way of a selected way station which requires no additional line wires, and further, is independent of the existence of present communication facilities such as telephone, telegraph and power lines. The system disclosed in this application utilizes the line circuit which connects the control office with the various spaced way stations along the trackway, such line circuit comprising a two-way code-communication system for at times transmitting control codes from the control station to a way station and transmitting indication codes from a way station to the control station. Such line circuits are commonly used in those areas under the control of a centralized traffic control system, hereinafter referred to for convenience as a CTC system.

Other objects, purposes and characteristic features of the present invention will be in part obvious from the accompanying drawings, and in part pointed out as the description of the invention progresses.

The invention, both as to organization and method of operation, together with further objects and advantages thereof, will best be understood by reference to the specification taken in connection with the accompanying drawings in which:

FIG. 1 schematically illustrates one organization of an area under control of a CTC system over which the communication system herein disclosed may be operated.

Figure 2:
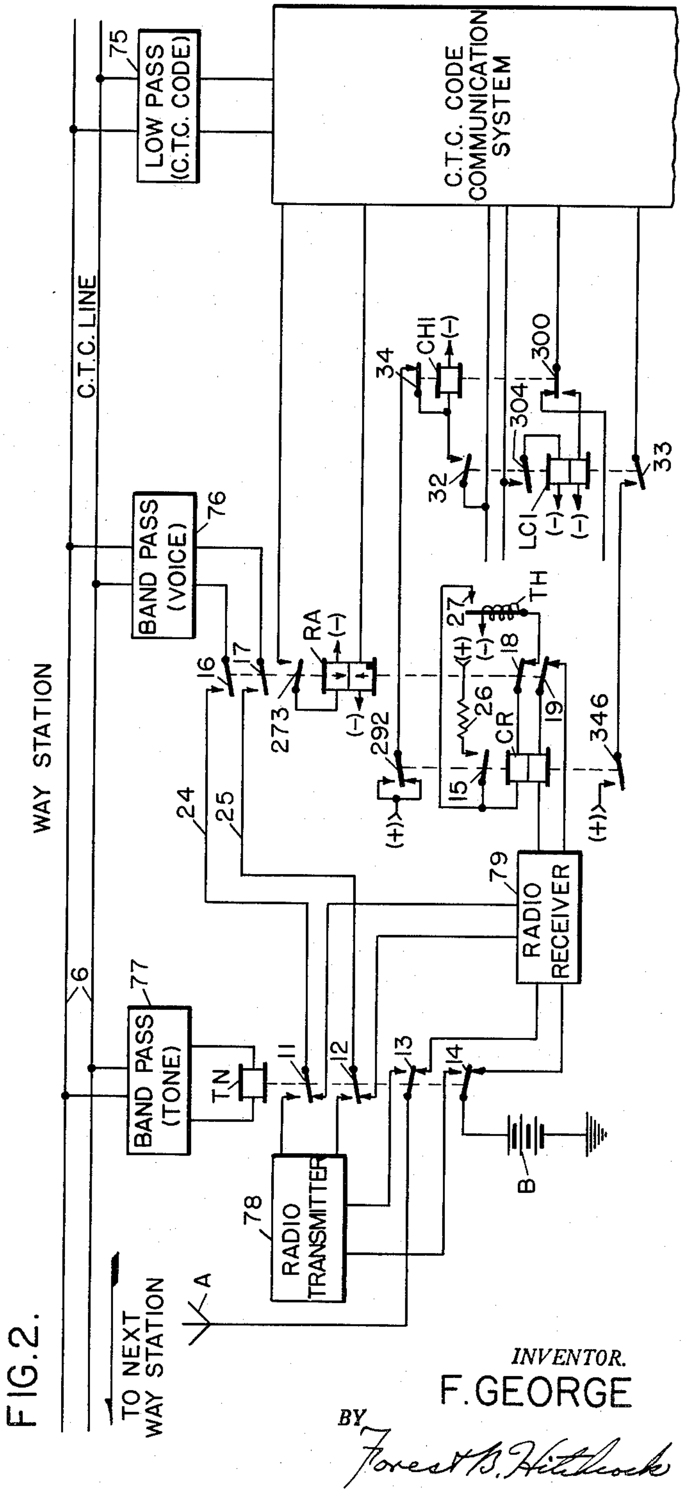

FIG. 2 diagrammatically illustrates one organization at a way station showing the radio transmitting and receiving means for relaying communications between vehicle stations and the control station along with various component parts affiliated with a CTC system shown by a block diagram.

Figure 3:
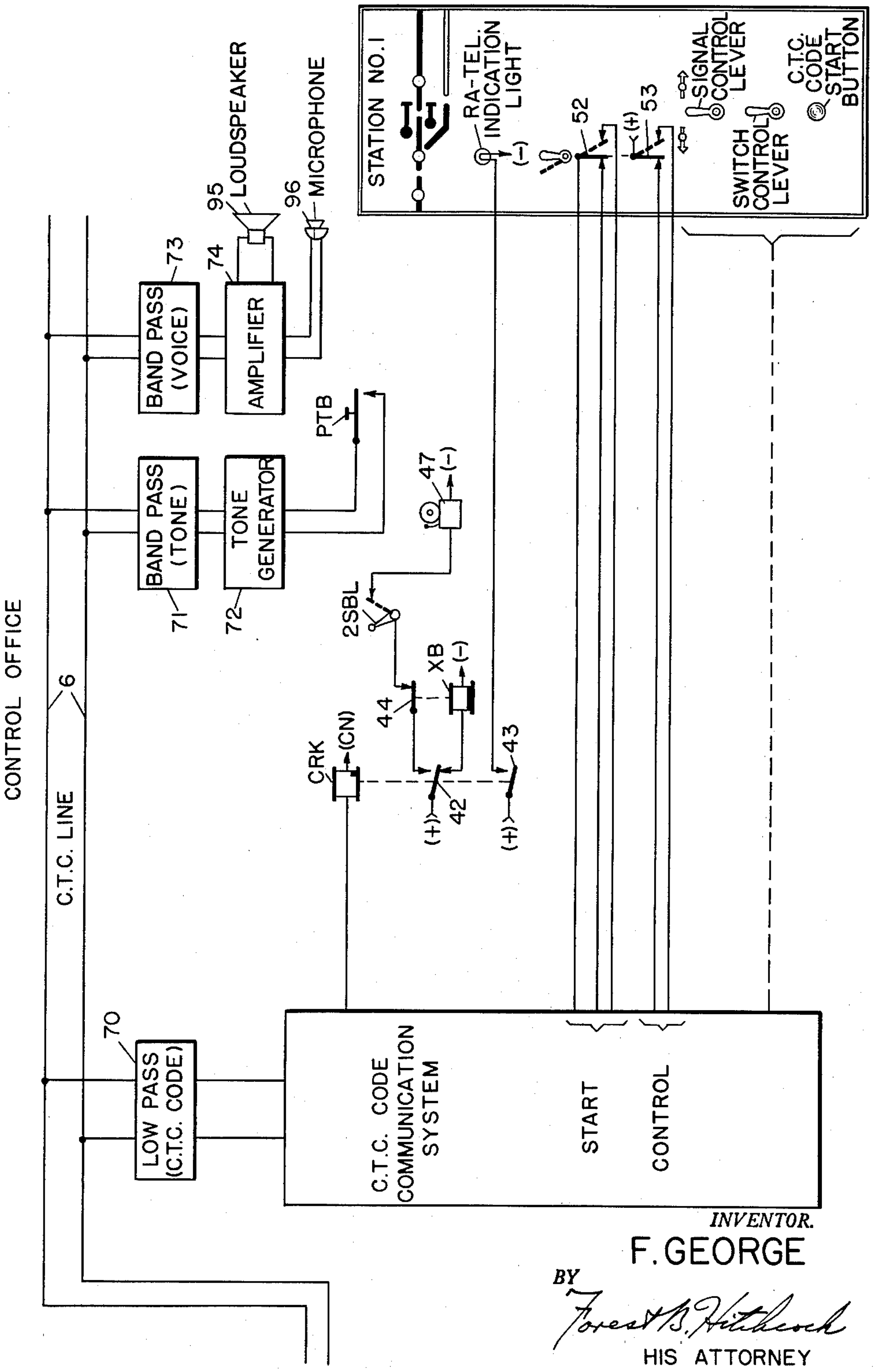

FIG. 3 diagrammatically illustrates one organization at a control office indicating the component parts of the system affiliated with a CTC system shown by a block diagram.

Figure 4:
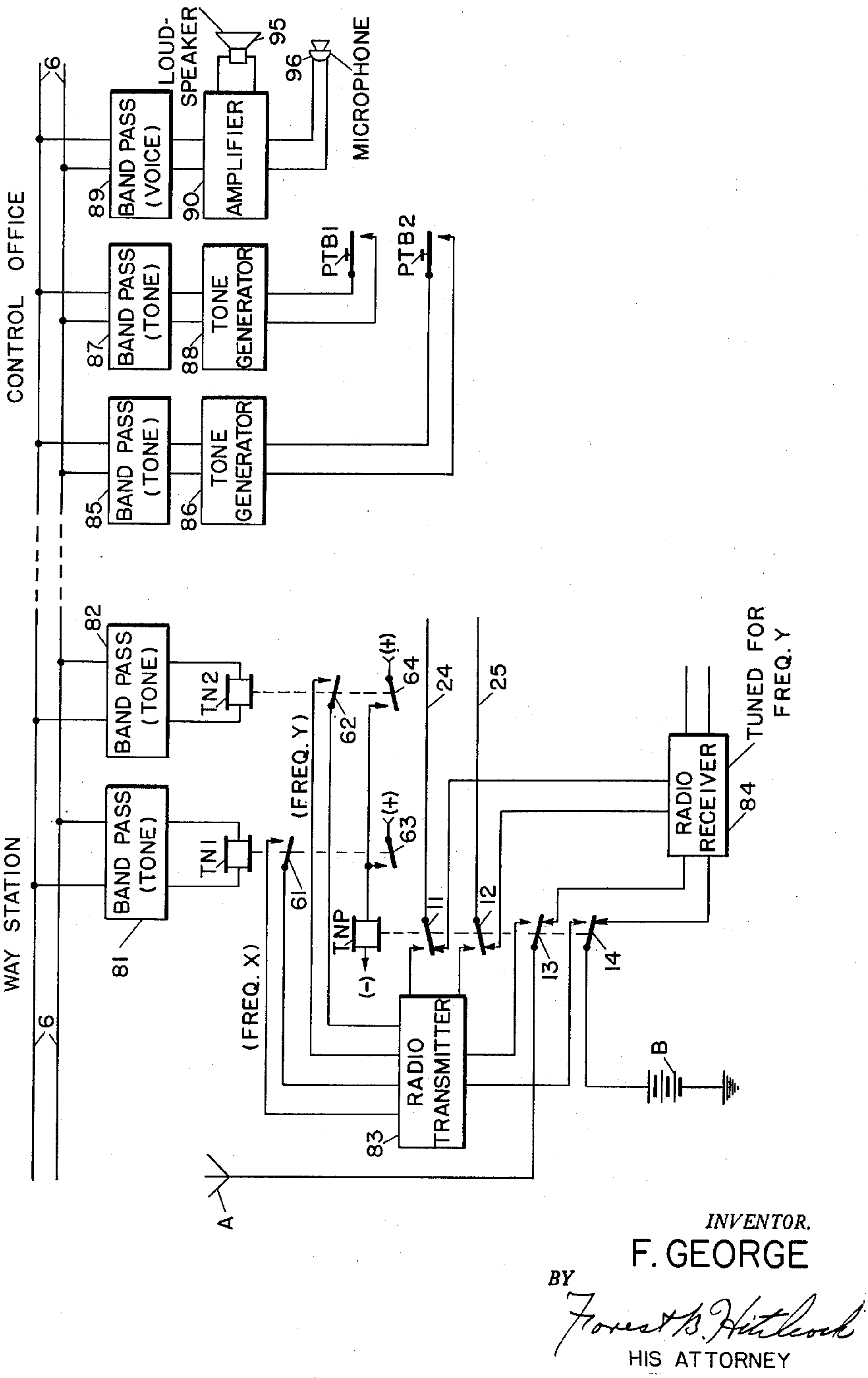

FIG. 4 is a modification of the organization shown in FIG. 2 and FIG. 3, diagrammatically illustrating an arrangement for using multiple tone frequencies.

In a line circuit communication system such as a CTC system for railroads, a central control office governs traffic through a particular assigned territory by line circuit communication of controls and indications. Inasmuch as the specific character of a CTC transmitting and receiving apparatus for communication of controls and indications over the line circuit had little bearing on the present invention, such apparatus has been indicated on the drawings in the form of a block diagram with few exceptions as pointed out later, and it is understood that this apparatus which is well known to those familiar with the art is provided according to the requirements of practice.

For purposes of explanation and to facilitate a better understanding of the present invention and without any intention of limiting the scope thereof, a discussion of the organization and operation of the radio communication system disclosed in this application, has been made with reference to a particular adaptation of such system to the particular CTC system disclosed by N. B. Coley in his patent application Ser. No. 359,727, filed June 5, 1953, which has resulted in Pat. No. 2,907,981, issued October 6, 1959. It should be pointed out, however, that the radio communication system may be adaptable to any other suitable line circuit communication means providing a continuous single channel for communication of controls and indications. Various reference characters on the enclosed drawings have been used to correspond to reference characters used in the Coley application cited above, to facilitate easier orientation between the two systems. Rather than to show wiring connections to all sources of energy, the symbols (+) and (−) have been used to indicate connections to the respective positive and negative terminals of a suitable plate or power supply.

Also, it should be understood that the line circuit must be properly terminated electrically in accordance with the usual practice. Since it is contemplated that the communication system of this invention is applicable to a line circuit having other services applied thereto, it is assumed that proper construction of the line circuit with respect to the other services may also take into consideration its proper electrical termination, and in many cases the devices in connection with such other services will themselves properly terminate the facilities.

Referring to the drawings and more particularly to FIG. 1 thereof, an organization of an area under CTC control, as there shown, indicates one arrangement for which the radio communication system described herein may be operated. The various filters required by the system have been shown as bridging type filters to facilitate convenient presentation of the elements involved and to provide an easier understanding of the organization. It is understood that the usual good practice is to use insertion type filters therein permitting different filter sections to be arranged in such a manner as to provide a proper impedance match. The invention herein disclosed is therefore adaptable to any suitable type filtering arrangement and no limiting significance regarding the use of any particular form should be placed upon the system. While the line circuit 6 connecting a plurality of spaced way stations 2, 3, 4, 5, etc. to the control office 10 comprises a code communication system for transmitting control codes from the control office 10 to any selected way station over said line circuit and also for transmitting indication codes from any particular way station to the control office, such line circuit 6 is also used to provide for voice signal transmission betweeen various vehicle stations 21 or 22, and the control office 10 by way of a particular way station. The vehicle stations 21 and 22 operating on the track 8 may be moving in either direction; and, as long as the area in which the vehicle station is moving is under the control of a CTC code communication system, voice communication may be carried on between the control office and a vehicle station.

Briefly considering the overall operation of the system without going into the functional details at the control office or each way station, it is convenient to consider two different phases of operation during which a completed communication may result. Each phase is identified by the type of station which initiates the cycle, for example, if a control office initiates a call to a vehicle station, such is designated the "initial control office calling phase" whereas when the vehicle station initiates a call to the control office, such is designated the "initial vehicle station calling phase." Hence, when the operator at the control office wishes to communicate with a vehicle station moving within the defined area above described, he selects that way station which he believes to be nearest the vehicle station. Determination of the particular wayside station nearest the vehicle station is reasonably accurate and may be done almost immediately by virtue of the fact that indications of train movements and conditions of all track functions at way stations are displayed in the control office on the control panel, a portion of which is shown in FIG. 3.

The control office operator selects the proper way station by actuating a manually operable lever corresponding to such way station such operation in turn causing the code communication system to transmit a control code over the CTC line circuit to select the designated way station and prepare it for two-way radio-telephone communication. As soon as the station is so selected, the control office operator actuates a push-to-talk button which sends a speecial control to the selected way station for rendering its radio transmittter effective to transmit any radio signal received over the CTC line circuit from the control office. Such operation described thus far completes what may properly be called the initial control office calling phase, and when such call is completed, the control office operator releases the push-to-talk button and awaits an acknowledging reply from the vehicle station. Such reply from the vehicle station is received by the radio receiver at the selected way station and is transmitted over the CTC line circuit to the control office where it is reproduced by the loudspeaker. In this manner, the control office operator can carry on a two-way voice communication with the vehicle station via a selected wayside station.

It should of course be understood that the vehicle station is equipped with radio transmitting and receiving equipment and that a voice message is reproduced by a loudspeaker when such message is received; also that the vehicle station operator must actuate a push-to-talk button when he desires to transmit.

When the two-way communication via that selected way station is completed, the control office operator restores the associated selecting lever in the office which deactivates the selected wayside station for radio-telephone communication. While deactivated, it can of course be conditioned by the reception of a radio signal for sending in an indication that a vehicle station desires to communicate via that wayside station.

Thus when an operator on the vehicle station wishes to communicate with the control office, he need only operate a push-to-talk button which sends out radio signals. These radio signals are picked up by the normally active radio receiver located at the appropriate wayside station, which in turn actuates means for the transmission of an indication code over the CTC line circuit to the control office. Such indication upon receipt at the control office and by circuit means provided thereat, energizes an indication light displayed upon the control panel for the purpose of informing the control office operator that a vehicle station is calling through that particular wayside station with which such indication light is associated.

In the particular form of organization shown in this application, receipt of such indication at the control office also rings a bell to inform the control office operator of the call message in the event the control panel is momentarily out of his range of vision. The provision of such bell mechanism is optional however, and may be provided with an individual off-on switch controllable at the discretion of the control office operator.

Once such indication is registered at the control office and when the control office operator is ready to accept the call, he may select the appropriate wayside station, indicated on the control panel, by means of a manually operable lever. Such manual operation of the lever corresponding to a particular wayside station causes a control code to be transmitted by the code communication system over the CTC line circuit which, when received at the designated wayside station, renders it active to establish two-way radio-telephone communication between the control office and the vehicle station. In order that the vehicle station will know that the control office operator is ready to receive his message, the control office operator actuates his push-to-talk button which transmits a special control to the selected way station for preparing the radio transmitter at the station to transmit. The control office operator then speaks into his microphone with an acknowledging message to the vehicle station after which he releases his push-to-talk button awaiting the message from the vehicle station. This prepares the radio transmitter at the selected wayside station for retransmitting any radio signals picked up by the radio receiver directly over the CTC line circuit to the control office where they are reproduced by a loudspeaker.

Such operation above described completes what may be properly called the initial vehicle station calling phase.

The control office operator may or may not reply. When the two-way communication between the control office operator and the vehicle station has been concluded, the lever corresponding to the selected wayside station is restored to a normal position which deactivates that wayside station for receiving and transmitting radio signals over the CTC line circuit.

As indicated above, the radius of space transmission from any one of the vehicle and wayside stations must necessarily be restricted in order not to interfere with radio communication upon assigned frequency channels. Such restriction necessarily limits the range of transmission for each vehicle station and each way station to a relatively short distance which may vary within limits depending upon the power output of the transmitter. It has been found that entirely satisfactory communication can be attained by spacing the various way stations from about ten to fifty miles apart and provide an effective pick-up and radiating range which will furnish a 100% overlap between adjacent way stations.

It should be pointed out that with a 100% overlap in the operating range of wayside stations, the initiation of a radio signal by a vehicle station in the manner above described may be picked up on the radio receiving means at two adjacent way stations. In such event, both way stations would transmit indication codes over the CTC line circuit to the control office, wherein the receipt of each indication will energize an indication light on the control panel indicating to the control office operator that two way stations have been prepared for two-way radio-telephone communication. As explained above, the control office operator, by means of the indications on the control panel, knows the approximate location of the vehicle station and will deliberately select that way station located in advance of the approaching vehicle. Since circuit means including a thermal relay have been provided at each wayside station for the purpose of restoring the radio receiver at each station to the normal operative condition, if, within a predetermined period of time that particular station is not selected by the control office operator for communication, it is immaterial if the radio signal from the vehicle station is picked up by more than one wayside station. Such timing apparatus will effectively restore the non-selected wayside station to the normal condition, rendering it available for calls from other vehicle stations moving along the trackway. The elements of such timing apparatus will be discussed in more detail in the later description of the functional arrangement at a particular wayside station.

Referring now to the functional details of the system and more particularly to the typical control office arrangement as shown in FIG. 3 of the drawings, it is pertinent to point out that the detailed elements diagrammatically illustrated therein are to be added to and incorporated in the existing CTC code communication facilities already provided at such control office. Hence, the component parts of a complete CTC code communication system have been conveniently designated in the form of a block diagram except where it is necessary for a better understanding of the communication system herein disclosed. In such instances, similar operative elements of the CTC code communication system have been illustrated and appropriate reference made as will be apparent hereinafter.

An abbreviated portion of a control panel (see FIG. 3) of the type commonly employed at a control office for use in connection with the control of a CTC code communication system has been indicated, along with an arrangement of additional controls that may be added to the control panel for operating a two-way radio-telephone communication system. It should be noted that the way in which the added controls are operated does not depart from that of the existing controls to such an extent that radical changes are required to be made as to the control panel itself. Further, such display of all track functions within a defined area, reproduced on the control panel, is advantageous to the control office operator during communications with a vehicle station in that it permits him to visualize the various positions of the vehicle station relative to other trackway conditions existing or arising within a defined area. It is evident, however, that the radio controls need not necessarily be placed on the same control panel, but may be placed at any convenient location.

As pointed out before, bridging type filters have been used instead of the conventional insertion type, to facilitate easier understanding of the presentation. Further, in order to intelligently discusses the function of each filter from the standpoint of the type of filter required and between what limits each filter is to be effective, it is convenient to use for the purposes of the discussion, a hypothetical example. Thus, assuming that the controls and indications which are transmitted along the CTC code-communication system have a frequency range between 0–30 cycles per second, it is necessary to use a low band pass filter 70 which will pass all modulated frequencies below thirty cycles per second. Such a low pass filter is bridged across the line circuit 6 between the CTC code communication circuits and the line circuit 6 and prevents any other frequencies which may be put on the line circuit 6 from interfering with the transmission of CTC control and indication signals.

Continuing with the above example and considering that the voice band frequency is between 500 and 2500 cycles, a band pass filter 73 which will pass all frequencies within those limits has been bridged across the line circuit 6 with its output side connected to a loudspeaker 95 and its input side connected to a microphone 96, both connections coupled to an amplifier 74. Hence, the loudspeaker 95 would not respond to transmitted signals at a frequency below 500 cycles or above 2500 cycles and no radio signal outside of that range could be put on the line circuit 6 by means of the microphone 96. Such a limited range of operation effected by these filters permits other services to be carried along on the same line circuit at frequencies other than those utilized without intefering with the communication system.

In order to permit the control office operator to prepare the facilities at any particular wayside station for two-way radio-telephone communication, it is expedient to use a tone for a particular frequency. Considering again therefore, our example, a band frequency between the range of 2600 and 3500 cycles has been reserved for tone control. A band pass filter 71 has been bridged across the line circuit 6 for this purpose and such band pass filter 71 will effectively pass only those tones having a frequency between 2600 and 3500 cycles. A push-to-talk button PTB is also provided at the control office and when operated by the control office operator, it applies a tone generator 72 to the line. The tone generator may of course be made to emit the tone of any particular frequency desired, however for our purposes and consistent with the discussion above, such tone frequencies are generally higher than the usual voice frequency. Since the component parts of such an organization described herein; i.e., filters, generators, amplifiers, etc., are well known in the art, detailed discussions of the elements of each are not relevant for the purposes of this disclosure and have therefore been dispensed with.

A magnetic stick relay CRK has been provided at the control office for governing the operation of the radio-telephone indication light referred to in the above discussion. This relay is similar to the relay TK shown and described in the Coley application previously cited and has the same functional purpose in this disclosure plus the additional function of controlling the radio-telephone indication light. While only one CRK relay is shown on the drawings, it should be understood that there must necessarily be one CRK relay for each way station to be located within the defined area. When a call from a vehicle station is received at a particular way station and an indication code is transmitted to the control office over the CTC code-communication system in the manner hereinbefore described, such indication code energizes relay CRK picking up contact 43 of the relay CRK thus completing the energizing circuit from a source of energy located within the CTC system, through the winding of relay CRK, through contact 43 of relay CRK, to the radio-telephone indication light on the control panel corresponding to that way station from which such indication originated.

As previously pointed out, a bell 47, responsive to an indication transmitted from a way station in a manner similar to the response of the radio-telephone indication light, may be provided at the control office. An energizing circuit for the operation of such bell has been shown in FIG. 3, the closing of such circuit being dependent upon the actuation of relay CRK in the same manner as described for such indication light. In the system shown in FIG. 3, only one indication bell control relay XB has been shown, since it is common practice to connect all of the indication relays CRK in series to one XB relay, for economical purposes. However, if it is found desirable, for other reasons, one XB relay could be furnished for each CRK relay to give the same results herein disclosed. Thus when contact 42 of relay CRK is picked up, a circuit is completed from (+), through contacts 42 of relay CRK and 44 of relay XB respectively, for operating the bell. The bell control relay XB is normally energized and is made slow to release so that upon interruption of its energizing circuit by the closing of front contact 42 of relay CRK, contact 44 of the relay XB remains closed just long enough for the bell 47 to ring before the energizing circuit to the bell is interrupted by the dropping away of contact 44. At the same time, the bell control relay XB is necessarily quick to pick up in order to respond to the speed of the system. An on-off switch 2SBL has been placed in the energizing circuit for the bell 47 to enable the control office operator to render the bell non-responsive for any period of time so desired.

Turning now to FIG. 2 of the drawings which illustrates one organization at a wayside station, it should be noted that the detailed elements diagrammatically illustrated therein are to be added to and incorporated in the CTC code-communication facilities already provided at the wayside station. Similar to the discussion above with reference to the control office arrangement shown in FIG. 3, the component parts of a complete CTC communication system have been conveniently designated in the form of a block diagram with a few exceptions which will be pointed out later. Further, similar operative elements between the organization shown herein and the Coley application previously cited have been appropriately referenced. Since the organization at all the wayside stations within the defined area is relatively the same, discussion of the arrangement will be limited to one wayside station and will necessarily be applicable to all similar wayside stations.

A low pass filter 75, shown as bridging the line circuit 6, operates to permit frequencies between the limits 0–30 cycles per second to pass, such frequencies being those frequencies selected in the example given above for operating the CTC code-communication system. Such low pass filter 75 is similar to the low band pass filter 70 previously discussed in connection with the arrangement at the control office. Thus with the low pass filter 70 and 75 described herein, the CTC code-communication system can operate between a control office and a particular wayside station independent of any other signal placed upon the line circuits and without interruption as a result of such signals.

Also located at a typical wayside station is a radio transmitter 78 and a radio receiver 79 associated with the usual antenna A and battery B. The battery B supplies anode potential for the various tubes of the receiver and transmitter, as selected through contacts of a tone responsive relay TN. The tone responsive relay TN is connected to the output side of a band pass filter 77, the input side of said band pass filter 77 being bridged across the line circuit 6. Such band pass filter 77 is effective to pass a tone having a frequency in the range of frequencies discussed in connection with the example given above. Thus a tone having a frequency between the limits of 2600 and 3500 cycles will be sufficient to energize the tone responsive relay TN. As the tone responsive relay TN is normally deenergized and its back contacts 11, 12, 13, 14, are therefore closed in the normal position it will be apparent that since the antenna A and the battery B are normally connected to the radio receiver 79 through back contacts 13 and 14 respectively, the radio receiver 79 at the wayside station is normally in a condition to receive. Correspondingly, with front contacts 13 and 14 of the tone responsive relay TN opened in the deenergized position, the radio transmitter 78 is normally inactive. Therefore, when the wayside station is at what may properly be designated the "at rest" condition, it will be readily apparent that a control office operator must necessarily "condition" such wayside station to transmit when the control office operator desires to communicate with a vehicle station via that particular wayside station.

As previously pointed out, such conditioning of a particular wayside station is initiated by the manual operation by the control office operator of a selector switch 52 and a push-to-talk button PTB located at the control office, putting a control code on the CTC code-communication line circuit and enabling a predetermined tone frequency to be generated and impressed on the same circuit. It is this generated tone to which the tone responsive relay TN has been made responsive. The control code, however, energizes the normally deenergized application control relay RA, a magnetic stick relay of the type shown in the above referred to Coley application and referred to therein as relay 3WZ. Hence, upon the operation of the selector switch 52 and the push-to-talk button PTB, front contacts 11 and 12 of the tone responsive relay TN and front contacts 16 and 17 of the application control relay RA are closed preparing the radio transmitter 78 to transmit any radio signal received over the CTC line circuit. Further the closing of contacts 16 and 17 applied the output side of the telephone section of the band pass filter 76 to the input side of the radio transmitter 78 for the purpose of modulating the radio transmitter 78. Such band pass filter 76 is effective to pass the same band frequencies as the band pass filter 73 located at the control office, namely, all frequencies between 500 and 2500 cycles.

It is apparent also from the arrangement shown on the drawings that when the respective relays TN and RA have been energized as described above, preparing the radio transmitter 78 to transmit any radio signal received over the CTC line circuit, the radio receiver 79 has thereby been rendered completely inactive, preventing any radio signal from a vehicle station from being received via any particular wayside station during this control office calling phase. Of course, when the control office operator releases his push-to-talk button PTB and the relay TN is restored to its normally deenergized position, the radio receiver 79 is again activated and as long as the control office operator leaves the selector switch 52 positioned to that particular wayside station, a message from a vehicle station operator will be relayed over the CTC line circuit 6 to the control office.

Considering again the wayside station to be at its "at rest" condition, when a vehicle station wishes to communicate with the control office, such vehicle station must necessarily inform the control office operator of such wish so that the control office operator may, by means of the manually operable selector switch 52, select the proper wayside station and condition such wayside station to relay the message in a manner just described. In this initial vehicle station calling phase, such call messages from the vehicle station are picked up by the radio receiver 79 at the way station and stored there for a time during which an indication can be sent back to the control office over the CTC line circuit. Receipt of such indication at the control office apprises the control office operator that a call is waiting his attention. Thus when the radio signal is picked up by the radio receiver 79 at the way station, the receipt of such signal energizes the carrier responsive relay CR picking up its contacts 292 and 346. Such carrier responsive relay CR is actually a squelch relay of the type well known in the art and is usually considered a part of the radio receiver but has been shown separately herein for clarity. It should also be noted that these contacts 292 and 346 are similar in function to contacts found in the previously cited Coley application and have been identically referenced for the purpose of orienting the system herein disclosed with the particular CTC arrangement shown in the Coley application, without however, any intention of limiting the present invention to that particular arrangement.

The change relay CH1 and its associated relay LC1 shown in FIG. 2, are also similar to identically referenced relays in the cited Coley application. In a CTC code-communication system it is necessary to provide relays of the type corresponding to CH1 and LC1 at each wayside station for governing the transmission of indication codes from the various wayside stations and to provide similar relays at the control office for governing the transmission of control codes from the control office to the wayside stations. In the usual CTC code communication system, a relay of each type is provided for each device such as a track switch or for each pair of opposing signals that is to be controlled from the control office. As we are adapting the communication system herein disclosed to such a code communication system, it is necesary to provide a relay of each type i.e. CH and LC, at each wayside station for governing the transmission of indications from the wayside station to the control office for control of the communication system.

Hence when the carrier responsive relay CR is energized in a manner described above, the normally energized change relay CH1 becomes momentarily deenergized, closing its back contacts which completes a pick-up circuit for the associated relay LC1. When the associated relay LC1 is so energized it closes its respective contacts to initiate an indication cycle and permit an indication to be transmitted from the wayside station over the CTC line circuit to the control office. It is immaterial what type of code characters are being transmitted for a particular CTC code communication system, as for example, "marks" and "spaces," since the communication system may be adapted to any particular code characteristic suitable to the operation of a CTC code communication system.

A stick circuit has been provided through the upper winding of the carrier responsive relay CR so that when the relay CR is energized upon receipt of a radio signal from a vehicle station by means of the radio receiver 79 at the wayside station, it will remain picked up for a certain period of time. Inserted in the stick circuit is a thermal relay TH for the purpose of shunting the upper winding of the carrier responsive relay CR after a predetermined time interval so that the relay CR becomes deenergized, and contact 15 drops away thereby interrupting the stick circuit. As explained before in my general description of the communication system, it is possible that with a 100% overlap in the operating range between wayside stations, that a vehicle radio signal may be detected by the radio receiver at more than one wayside station. This would result in the transmission of an indication code to the control office from more than one wayside station, thus giving the control office operator a choice in selecting that particular wayside station over which he wishes to communicate with the vehicle station. Without the provision of some timing device to restore the organization at a wayside station to its normal condition, the only means by which such organization could be so restored would be by the selection of that wayside station by the control office operator through the medium of his selector switch. Hence, when two wayside stations are simultaneously indicated on the control panel as having a vehicle call waiting, selection by the control office operator of either station will permit him to receive the call but would result in rendering the non-selected way station unable to detect a radio signal from any other vehicle station within range of that particular wayside station. Thus, in providing a thermal relay TH, the time permitted the control office operator to select that particular wayside station may be limited, for example, to 30 seconds. If, after the predetermined time has elapsed, the control office operator has not selected that particular wayside station, the thermal relay TH will shunt the upper winding of the carrier responsive relay CR so that when such relay CR is deenergized, the stick circuit will be interrupted.

Turning now to the operation of the radio-telephone communication system and considering along therewith the cooperation between the vehicle station, wayside station, and the control office during a communication cycle, it is expedient to consider first the operating characteristics when the control office operator wishes to communicate with a particular vehicle station moving within the defined area.

With the visual aid of the control panel, the operator knows the approximate location of the particular vehicle station with which he wishes to communicate. By means of the manually operable selector switch 52, he selects that particular wayside station which is in advance of the approaching vehicle station and simultaneously depresses his push-to-talk button PTB and initiates a call message over the microphone 96. The operation of the selector switch 52 enables a particular control code to be transmitted over the line circuit 6, by means of the CTC code communication system, to the selected way station. Such control code is subsequently decoded at the selected way station by decoding apparatus located in the CTC system provided at such way station, and completes an energizing circuit for the application control relay RA from a source within the CTC code communication system through the lower winding of relay RA, to (−). Thus, relay RA is energized with a polarity such as to open its back contacts 18 and 19. Opening of back contacts 18 and 19 respectively, does not render the radio receiver 79 at the way station inactive, but merely prevents any message that may be detected by the radio receiver 79 from causing an indication to be transmitted over the CTC code communication system to the control office. Thus the respective opening of contacts 18 and 19 render the energizing circuit for the carrier responsive relay CR incomplete. At the same time, energization of relay RA closes its contact 273, providing an energizing circuit for the upper winding of relay RA from a source (not shown) within the CTC code communication system through contact 273, through the upper winding of relay RA, to (−). When relay RA is energized upon receipt of the appropriate code, front contacts 16 and 17 of relay RA are also closed. By operation of the push-to-talk button PTB by the control office operator, a predetermined tone frequency is generated and impressed on the line circuit 6 by means of the tone generator 72. Such tone frequency is detected at the wayside station by the normally deenergized tone responsive relay TN. Detection of this predetermined tone frequency energizes relay TN and closes front contacts 11, 12, 13, 14 of the relay TN, connecting the battery B to the input side of the radio transmitter 78. With front contacts 16 and 17 of the application control relay RA picked up and contacts 11 and 12 of the tone responsive relay TN likewise picked up, the output side of the band pass filter 76 is applied to the input side of the radio transmitter 78 over the line wires 24 and 25 for the purpose of modulating the transmitter 78.

It should be pointed out that while the energization of the application control relay RA by the means just described does not inactivate the radio receiver 79 since the output of the radio receiver is applied to the telephone section of the band pass filter 76 for transmission when the relay TN is in the deenergized position, the energization of the tone responsive relay TN by the operation of the push-to-talk button PTB by the control office operator does deactivate the radio receiver 79. Hence, the opening of back contacts 11 and 12 of the relay TN interrupts the output circuit for the radio receiver 79 and the opening of back contacts 13 and 14 disconnects the battery B from the input circuit to the radio receiver, the combined operations completely deactivating said radio receiver during the initial control office calling phase. At this stage of operation, the radio transmitter 78 has been prepared to transmit all radio signals received over the CTC line circuit. Thus, the call message initiated by the control office operator by means of the microphone 96 located at the control office is placed on the CTC line circuit 6 and such radio signals are retransmitted by the radio transmitter 78 to the vehicle station. It is apparent that the apparatus at the vehicle station is in its normal "at rest" condition and similar to the apparatus at the wayside station must necessarily be in a condition to receive.

When the control office operator has completed his initial control office calling phase and desires an acknowledging response from the vehicle station before completing his message, he must release his push-to-talk button PTB which applies the output side of the radio receiver 79 to the telephone section of the band pass filter 76 for transmission. The selector switch 52, however, remains at the same position so that such acknowledging message will be retransmitted from the vehicle station to the control office via that selected way station. Now when such call message from the control office is received at the vehicle station in the manner described above, such voice message is reproduced over a loudspeaker (not shown) which gives audible notice of such call to the vehicle station operator. The vehicle station operator may or may not answer, however, usually he acknowledges receipt of the call. To make such acknowledgment, the vehicle station operator depresses his push-to-talk button (not shown) located at the vehicle station thereby initiating an acknowledging message in the same manner in which he initiates a call to the control office during the initial vehicle station calling phase. These radio signals transmitted by the vehicle station operator are picked up by the normally active radio receiver 79 at that wayside station already selected by the control office operator and are retransmitted over the line circuit 6 to the control office. Since the way station has already been prepared by the control office operator for transmitting any radio signal received over the CTC line circuit, in accordance with the manner described hereinbefore, the vehicle station operator may also acknowledge such a call by a voice message after depressing his push-to-talk button, and such audio acknowledgement will be reproduced over the loudspeaker 95 located at the control office. Having once acknowledged the call, the vehicle station operator releases his push-to-talk button and awaits the message from the control office operator. Thus, by the alternate operation of their respective push-to-talk buttons, two-way conversation can be carried on between the control office and a vehicle station via a particular way station.

Considering now the operation of the organization when a vehicle station which is moving within the defined area wishes to communicate with the control office, the vehicle station operator depresses his push-to-talk button and thus transmits a radio signal initiating the vehicle station calling phase. With the equipment at the wayside station in its "at rest" condition, such a radio signal from the vehicle station is picked up by the normally active radio receiver 79 at the wayside station by means of the antenna A through back contact 13 of the tone responsive relay TN. Before a radio signal can be retransmitted to the control office, it is necessary for the application control relay RA to be energized thus closing front contacts 16 and 17 applying the output side of the radio receiver 79 to the telephone section of the band pass filter 76 for transmission to the control office. As explained before, the energization of the relay RA is effected by the operation of the selector switch 52 by the control office operator. In order to inform the control office operator that a call is waiting, an indication code is transmitted over the CTC code communication system to the control office where such indication codes, when decoded, operates apparatus to inform the control office operator of such waiting call over which particular way station such call is being relayed. More particularly, receipt of such radio signal by the radio receiver 79 at the way station, completes an energizing circuit for the lower winding of the carrier responsive relay CR from the radio receiver 79 through back contact 19 of relay RA, lower winding of relay CR, to the radio receiver, picking up the respective contacts 15, 292, and 346 of relay CR.

Closing front contact 15 of the carrier responsive relay CR completes a stick circuit for the upper winding of relay CR permitting said relay to remain picked up for a period of time determined necessary to allow the control office operator to be apprised of such call and make a proper selection. This period of time, as explained before, should be approximately thirty seconds and is controlled by the operation of a thermal relay TH which has been placed in the stick circuit for such upper winding of relay CR. An adjustable resistor 26 has been connected between the source of supply (+) and front contact 15 to permit adjustment to be made as to the period of time determined to be desirable for keeping the relay CR in the energized condition and also to prevent a short on the battery where the stick circuit is shunted. Hence, the stick circuit extends from (+) through the adjusted resistor 26, front contact 15 of relay CR through the upper winding of relay CR, back contact 18 of relay RA, through the winding of the thermal relay TH to (−). Of course when the thermal relay TH, which is composed of two or more metals having different coefficients of expansion, is heated to the critical temperature for which it has been designed to be effective, it will act to shunt the carrier responsive relay CR so that the contacts 15, 346, and 292 of the relay CR drop away, interrupting the stick circuit for said upper winding. As pointed out above, the insertion of the thermal relay TH serves to prevent the carrier responsive relay CR from remaining energized for a period of time longer than the length of time required by the control office operator to select that wayside station. The thermal relay TH used as the timing device is merely one kind of such timing apparatus that could be used, and other timing devices may be interposed in lieu of the one described herein. The stick circuit described thus keeps the carrier responsive relay CR energized for a definite period after the radio receiver has ceased to pick up further voice signals from the vehicle station.

It will be seen from the drawings and more particularly FIG. 2, that the change relay CH1 is normally energized by a circuit from (+) through back contact 292 of relay CR, front contact 34 of relay CH1, through the winding of the relay CH1 to (−). When relay CR is energized closing its front contact 292 and opening its back contact 292, there is a momentary interruption of current supply to the change relay CH1 causing its front contacts 34 and 300 to drop away and closing back contact 300. When back contact 300 of relay CH1 is closed, an energizing circuit is completed for the associated relay LC1 from a source (not shown) within the CTC code communication system, back contact 300 of relay CH1, through the lower winding of relay LC1 to (—). When the associated relay LC1 is energized closing its front contacts 32, 304, and 33 respectively, and with front contact 346 of the carrier responsive relay CR already closed in a manner above described, the communication system is properly connected with the CTC code communication system for the purpose of transmitting an indication from the way station to the control office. Hence upon receipt of a radio signal from the vehicle station, an indication code is transmitted through the CTC code communication system over the line circuit 6 to the control office.

Looking again at FIG. 3 of the drawings, when such indication code has been transmitted from the way station, it is received by the CTC code communication system at the control office where it is subsequently decoded by decoding relays (not shown) within the CTC system. Such a decoded indication energizes a magnetic stick indication relay CRK, through the winding of relay CRK to (CN).

For convenience, only one CRK relay has been shown at the control office, however, in actual practice it is understood that there will be one corresponding CRK relay for each way station in the system. Each of said CRK relays controls its radio-telephone indication light in response to an indication sent from a particular way station. Thus when the relay CRK is energized, front contact 43 of relay CRK is picked up completing an energizing circuit for the indication light from (+) through contact 43 to the indication light on the control panel. Also in the system shown, an appropriate energizing circuit has been shown for energizing the indicator bell control relay XB. When the indication relay CRK is energized, closing its front contact 42, the energizing circuit from (+) through back contact 42, through the winding of relay XB to (—) which normally energizes the bell control relay XB is interrupted. With front contact 42 of relay CRK closed, an energizing circuit for the indicator bell is then completed from (+) through said front contact 42, front contact 44 of relay XB, through the indicator bell 47 to (—). Such relay XB is a slow-acting relay so indicated to show that upon the energization of relay CRK by an indication, the bell will strike once before relay XB drops away. Further, relay XB, although slow to release, is necessarily quick to pick up so that it may be in a position to respond to any indication that may immediately follow from another way station. It is understood that in actual practice all CRK relays are connected in series with only one XB relay; hence, for the purpose of illustration, only one typical XB relay has been shown. Other means of control for the indicator bell may be provided however, for example, one XB relay could be furnished for each CRK relay in the system.

The two-position switch 2SBL enables the control office operator to completely inactivate the indicator bell 47 if so desired. Although switch 2SBL has been shown in the present invention as being connected between front contact 44 of relay XB and the indicator belt 47, it could be placed at any convenient location.

Once the control office operator has been either visually or audibly apprised of a waiting call, he may select the proper way station by means of the manually operable switch 52 thus conditioning the equipment at the way station to transmit, such conditioning being accomplished by the same procedure previously outlined above. If the control office operator wishes to acknowledge the call verbally, then in addition to selecting the station, he actuates his push-to-talk button and initiates an acknowledging call. If the control office operator is unable to accept the call, he need not select the way station indicated on the control panel, in which event, the operation of the thermal relay TH will permit the equipment at that way station to be restored to its normal condition after a predetermined period of time. In any event, once the control office operator has selected the indicated way station via which such vehicle call is being relayed, alternate operation of respective push-to-talk buttons will again permit a two-way conversation to be carried on between the vehicle station and the control office.

Turning now to FIG. 4 of the drawings which illustrates one modification of the organization described above, the arrangement in FIG. 4 provides for the use of muliple tone frequencies for initiating a two-way radio communication between a control office and a vehicle station. It has been found expedient in some instances in various train communication systems to operate on different frequencies between certain points of communication. For example, vehicle to vehicle and end-to-end communication may be carried on with a carrier frequency X. Since these type of communications are usually more frequent than those between a vehicle station and the control office, the equipment on the vehicle stations is usually tuned to this carrier frequency X. In order to prevent a communication between a vehicle station and the control office from interfering with vehicle to vehicle or end-to-end communication, it has been found convenient to use a different carrier frequency, such as a carrier frequency Y for any such communication between the control office and a vehicle station. Using a different carrier frequency as just described also prevents any communication from vehicle to vehicle or end-to-end from being picked up by the normally active radio receiver 84 since said radio receiver 84 has been tuned for frequency Y only. Hence without further modification of the system herein disclosed, the control office would be unable to call a vehicle station whose radio equipment was normally tuned to a different carrier frequency. FIG. 4 therefore provides a solution to such a problem showing only that part of the system to which modification is required and for the purposes of this disclosure it is assumed that all of the other elements shown in FIG. 2 and FIG. 3 such as relay CR, RA, LC1, etc., remain the same.

Briefly, with the arrangement of the two-way radio-telephone communication system as shown in FIG. 4, the control office operator has at his disposal a means of initiating the control office calling phase on carrier frequency X, first selecting the appropriate way station in the same manner as described hereinbefore by means of the manually operable lever 52 shown in FIG. 3, then depressing the push-to-talk buttons PTB1. The push-to-talk button PTB1 applies the output of tone generator 88 to the CTC line circuit 6, such tone generator 88 producing output of tone X which has a suitable frequency between the limits of 2600 and 3500 cycles. Push-to-talk button PTB2 applies the output of tone generator 86 to the CTC line circuit 6, such tone generator 86 producing an output or tone Y which has a suitable frequency also between the limits of 2600 and 3500 cycles but such frequency being distinctively different from the frequency of the output of tone generator 88.

Hence, as the equipment at the vehicle station is normally tuned to carrier frequency X to facilitate train to train or end-to-end communication, the control office operator may actuate the push-to-talk button PTB1 which will prepare the equipment at the wayside station to transmit on carrier frequency X and the vehicle station operator will receive a call on frequency X. In order to reserve frequency X for the purpose before explained, the vehicle station operator upon receipt of such call from the control office on frequency X, switches his equipment over to frequency Y by means of a radio frequency change switch (not shown) located at the vehicle station. Once contact of this nature is established then the two-way radio-telephone communication is carried on over carrier frequency Y in the same manner as previously described in connection with FIGS. 1, 2, and 3.

In reality, this modification then enables a two-way conversation to be initiated on either frequency X or frequency Y and obviously when the vehicle station operator wishes to communicate with the control office operator he may initiate the radio signal on only frequency Y. It should be apparent that the system is capable of handling additional frequencies such as frequencies C, D, E, etc. as the conditions require.

It should be noted that the modification requires no change in the low pass filters 70 and 75, nor is any change required in band pass filters 73 and 76, all of which are shown in FIG. 2 and FIG. 3. The band pass filters 85 and 87 are similar to the band pass filter 71 disclosed at length in connection with FIG. 3. Further, as stated before, each tone generator 86 and 88 is applied to the line circuit 6 by the push-to-talk buttons PTB1 and PTB2 respectively.

At the wayside station, in addition to the two band pass filters 81 and 82, each of which has been modulated for a particular frequency and therefore effective to pass the tone received on that particular frequency, corresponding tone responsive relays TN1 and TN2 are required. The operation of either tone responsive relay TN1 or TN2 is reflected in the repeater relay TNP which, when energized, operates contacts 11, 12, 13, and 14. The operation of such contacts accomplish the same purposes as previously described in connection with FIG. 2 for the operation of the single tone responsive relay TN.

Thus when the control office operator actuates push-to-talk button PTB1, the tone generator 88 is applied to the line circuit 6, which tone actuates the tone responsive relay TN1 at the wayside station picking up contacts 61 and 63 of the relay TN1. When the front contact 63 is picked up, an energizing circuit for the tone repeater relay TNP is completed from (+), through contact 63, through the windings of relay TNP to (−). With relay TNP now energized, contacts 11, 12, 13, and 14 are operated to control the system in a manner similar to that described before in the discussion relative to FIG. 2. The operation by the control office operator of push-to-talk button PTB2, along with the subsequent energization of the tone responsive relay TN2 and the response of the system, is identical to that described relative to the operation of push-to-talk button PTB1.

Having described the selective radio communication system between the vehicle station and a control office via a way station, it is desired to be understood that this form is selected to facilitate in the disclosure of the invention rather than to limit the number of forms which it may assume. It is further understood that various modifications, adaptations, and alterations may be applied to the specific form shown to meet the requirements of practice without in any manner departing from the spirit or scope of the present invention.

What I claim is:

1. In a communication system for railroads, a control office and a plurality of way stations located along a trackway, a line circuit extending between the control office and said way stations, a code communication system for transmitting control codes from said control office to any selected way station over said line circuit and also to transmit indication codes from any particular way station to the control office, a radio transmitter and receiver at each way station and on a moving vehicle travelling along the trackway, means at each way station acting in response to the reception of a radio signal from said vehicle for causing the transmission of a distinctive indication code over said code communication system to said control office to give an indication characteristic of that particular way station receiving the radio signal, means manually operable for causing the transmission of a distinctive code over said code communication system to select any desired way station for radio communication with the moving vehicle within range of that way station, and telephone communication means operative over said line circuit with any selected way station for causing said telephone communication to be relayed through the radio transmitting and receiving means at that selected way station.

2. In a communication system for a railroad having a defined area under the operative control of a master control station, including a plurality of way stations located within such area and along the railroad trackway and a vehicle station moving within said defined area, code communication means including a line circuit for the transmission of control codes from said control station to any particular way station and transmission of indication codes from any particular way station to said control station, radio transmitting and receiving means at each of said way stations for detecting any relaying radio signal transmission from a vehicle station to said control station and from said control station to a vehicle station, circuit means at each of said way stations acting in response to the reception of a radio signal from said vehicle station for transmission of a distinctive indication code over said code communication means to said control station indicating that a vehicle station wishes to communicate through that particular way station, said circuit means also responsive to control codes from said control station over said code communication means for conditioning said particular way station to relay radio signal transmission from said control station to said vehicle station, and radio transmitting and receiving means at said vehicle station for communicating with said control station.

3. In a communication system for railroads, a control office and a plurality of way stations located along a trackway, a line circuit extending between said control office and said way stations, a code communication system for transmitting control codes from said control office to any selected way station over said line circuit and also to transmit indication codes from any particular way station to the control office, a radio transmitter and receiver at each way station and on a moving vehicle travelling along the trackway, manually operable means for causing the transmission of a distinctive code over said code communication system to select any desired way station for radio communication with the moving vehicle within range of said particular way station, said manually operable means including means for selecting a plurality of frequencies on which said radio communication may be transmitted between said control office and said moving vehicle, means at each way station responsive to any of said multiple frequencies for preparing said radio transmitter and receiver at said way station for transmitting said radio communication, means at each way station acting in response to the reception of a radio signal from said vehicle for causing the transmission of a distinctive indication code over said code communication system to said control office to give an indication characteristic of that particular way station receiving the radio signal, and telephone communication means operative over said line circuit with any selected way station for causing said telephone communication to be relayed through the radio transmitting and receiving means at the selected way station.

4. In a communication system for railroads, a vehicle station, a control station and a plurality of way stations located at spaced points along a trackway, radio receiving and transmitting means located at said way stations and said vehicle station, a line circuit connecting said way stations to said control station, a two-way code-communication system for at times transmitting control codes from said control station to a way station and transmitting indication codes from a way station to said control station over said line circuit, circuit means acting in response to the reception of a radio signal from said vehicle station for transmitting over said line circuit by said code communication system an indication characteristic of a particular way station that said particular way station is conditioned for radio communication including means for retaining said radio communication indication until acknowledged at said control station thereby preventing interruption of existing communications, means manually operable for acknowledging said indication characteristic of said particular way station, telephone communication means operative over said line circuit connected with said particular way station for causing said telephone communication to be relayed to said vehicle station through said radio receiving and transmitting means at said way station.

5. In a communication system for railroads, a vehicle station, a control station and a plurality of way stations located at spaced points along a trackway, a radio receiving and transmitting means located at said way stations and said vehicle station, a line circuit connecting said way stations to said control station, a two-way code-communication system for at times transmitting control codes from said control station to a way station and transmitting indication codes from a way station to said control station over said line circuit, circuit means acting in response to the reception of a radio signal from said vehicle station for transmitting over said line circuit by said code communication system an indication characteristic of a particular way station that said particular way station is conditioned for radio communication including means for retaining said radio communication indication until acknowledged at said control station and preventing interruption of existing communications, means manually operable for acknowledging said indication characteristic of said particular way station, circuit means at each way station for restoring said radio and transmitting means located at said way station to its normal condition if said radio communication indication is not acknowledged within a definite time interval, telephone communication means operative over said line circuit connected with said particular way station for causing said telephone communication to be relayed to said vehicle station through said radio receiving and transmitting means at said way station.

6. In a communication system for railroads, a vehicle station, a control station and a plurality of way stations located at these points along a trackway, a radio transmitting and receiving means located at said way stations and said vehicle station, a line circuit connecting said way stations to said control station, a two-way code communication system for at times transmitting control codes from said control station to a way station and transmitting indication codes from a way station to said control station over said line circuit, circuit means acting in response to the reception of a radio signal from said vehicle station for transmitting over said line circuit by said code communication system an indication characteristic of a particular way station that said particular way station is conditioned for radio communication, said circuit means including means for retaining said radio communication indications until acknowledged at said control station thereby preventing interruption of existing communications, means manually operable for acknowledgement of said indication characteristic of said particular way station, said manually operable means including means for selecting a plurality of frequencies on which said radio communication may be transmitted between said control station and said vehicle station via that particular way station, telephone communication means operative over said line circuit connected with said particular way station for causing said telephone communication to be relayed to said vehicle station through said radio receiving and transmitting means at said way station.

7. In a radio communication system for railroads having a centralized traffic control system comprising a two-way code communication system for at times transmitting control codes from a control office station to a way station and transmitting indication codes from the way station to the control office station, a line circuit connecting the two stations and circuit means at each station for receiving and transmitting said indication and control codes, a vehicle station moving within said centralized traffic control system and having radio receiving and transmitting means for communication between said vehicle station and said control office station by way of said way station, said way station having radio receiving and radio transmitting means for relaying said messages from the control office station to said vehicle station or from a vehicle station to said control office station, circuit means including said centralized traffic control system for selecting the proper way station by way of which said control office station may communicate with said vehicle station or a vehicle station with said control office station, and signalling means for transmitting indications over said code communication system to said control office station acting in response to the reception of a radio signal from said vehicle station for displaying the readiness of a way station to communicate including means for preventing the transmission of voice communication until said way station is properly selected at said control office station whereby conversation already in progress may continue uninterrupted.

8. In a communication system for railroads, a control office and a plurality of way stations located along the trackway, a line circuit extending between the control office and said way stations, a code communication system for transmitting control codes from said control office to any selected way station over said line circuit and also to transmit indication codes from any particular way station to the control office, a radio transmitter and receiver located at each way station and on a moving vehicle travelling along the trackway, means at each way station acting in response to the reception of a radio signal for causing the transmission of a distinctive indication code over said code communication system to said control office to give an indication characteristic of that particular way station receiving the radio signal, circuit means for holding said radio signal indication until acknowledged by the control office and preventing interruption of existing communication, means manually operable for causing the transmission of a distinctive code over said code communication system to select any desired way station for radio communication with the moving vehicle within range of that way station, and telephone communication means operative over said line circuit with that particular selected station for causing said telephone communication to be relayed through the radio transmitting and the receiving means at that station.

9. In a radio communication system for railroads having a centralized traffic control system comprising a two-way code communication system for at times transmitting control codes from a control office station to a way station and transmitting indication codes from the way station to the control office station, a line circuit connecting the two stations and circuit means at each station for receiving and transmitting said indication and control codes, a vehicle station moving within said centralized traffice control system and having radio receiving and transmitting means for communication between said vehicle station and said control office station by way of said way station, said way station having radio receiving and radio transmitting means for relaying said messages from the control office station to said vehicle station or from a vehicle station to said control office station, circuit means including said centralized traffic control system for selecting the proper way station by way of which said control office station may communicate with said vehicle station or a vehicle station with said control office station, signalling indications including visual and audible indicator means transmitted over said code communication system to said control office station displaying the readiness of a way station to communicate including means for preventing the transmission of a voice communication until said way station is properly selected at said control office station whereby conversation already in progress may continue uninterrupted, and circuit means at each way station including a timing device for restoring said way station to its normal condition at the end of a predetermined interval determined by said timing device if said way station is not properly selected at said control office.

10. In a radio communication system for railroads having a centralized traffice control system comprising a two-way code communication system for at times transmitting control codes from a control office station to a way station and transmitting indication codes from the way station to the control office station, a line circuit connecting the two stations and circuit means at each station for receiving and transmitting said indication and control codes, a vehicle station moving within said centralized traffic control system and having radio receiving and transmitting means for communication between said vehicle station and said control office station by way of said way station, said way station having radio receiving and radio transmitting means for relaying said messages from the control office station to said vehicle station or from a vehicle station to said control office station, circuit means including said centralized traffic control system for selecting the proper way station by way of which said control office station may communicate with said vehicle station or a vehicle station with said control office station, said circuit means also including means for selecting a plurality of frequencies on which said radio communication between said control office and said vehicle station may be transmitted over said line circuit, signalling means for transmitting indications over said code communication system to said control office station acting in response to the reception of a radio signal from said vehicle station for displaying the readiness of a way station to communicate but storing such communication until acknowledged by said control office station, and telephone communication means operative over said line circuit with that selected way station for causing said telephone communication to be relayed through the radio transmitting and receiving means at that selected way station.

11. In a communication system for railroads, a control office and a plurality of way stations located along a trackway, a line circuit extending between the control office and said way stations, a code communication system for transmitting control codes from said control office to any of said way stations over said line circuit and also to transmit indication codes from any particular way station to the control office, a radio transmitter and receiver located at each of said way stations and also on a moving vehicle travelling along said trackway, means at each way station acting in response to the reception of a radio signal from a vehicle on the trackway for causing the transmission of a distinctive indication code over said code communication system to said control office to give an indication characteristic of that particular way station receiving the radio signal, circuit means for holding said radio signal indication until acknowledged by the control office and preventing interruption of existing communication, means manually operable for causing the transmission of a distinctive code over said code communication system to select any desired way station for radio communication with the moving vehicle within range of that way station, said manually operable means including means for selecting a plurality of frequencies on which said vehicle station can be notified that a radio communication is desired by said control office between said moving vehicle and said control office via said particular way station, radio frequency changing means provided at said moving vehicle permitting said moving vehicle to transfer the operation of said radio transmitter and receiver located at said vehicle to a particular predetermined frequency for communication with said control office after being notified by said control office over any of the plurality of frequencies so selected, and telephone communication means operative over said line circuit with that particular selected station for causing said telephone communication to be relayed through the radio transmitting and receiving means at said particular station.

References Cited in the file of this patent

UNITED STATES PATENTS

| | | |
|---|---|---|
| 1,902,817 | Affel et al. | Mar. 28, 1933 |
| 1,978,286 | Sommer | Oct. 23, 1934 |
| 1,985,241 | Daya | Dec. 25, 1934 |
| 2,061,027 | Espenschied et al. | Nov. 17, 1936 |
| 2,272,106 | Ash | Feb. 3, 1942 |
| 2,297,172 | Sorenson | Sept. 29, 1942 |
| 2,303,875 | Baughman et al. | Dec. 1, 1942 |
| 2,611,075 | Marlowe | Sept. 16, 1952 |
| 2,883,521 | Curry | Apr. 21, 1959 |